(12) United States Patent
Ladan et al.

(10) Patent No.: US 11,163,967 B2
(45) Date of Patent: Nov. 2, 2021

(54) CHIPLESS RFID TAG USING HYBRID CODING

(71) Applicant: Palo Alto Research Center Incorporated, Palo Alto, CA (US)

(72) Inventors: Shabnam Ladan, Menlo Park, CA (US); David Eric Schwartz, Concord, MA (US); Farzad Michael David Inanlou, Redwood City, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 16/515,628

(22) Filed: Jul. 18, 2019

(65) Prior Publication Data
US 2021/0019484 A1    Jan. 21, 2021

(51) Int. Cl.
| | |
|---|---|
| *G06K 19/06* | (2006.01) |
| *G06K 7/14* | (2006.01) |
| *G06K 19/067* | (2006.01) |
| *G06K 19/077* | (2006.01) |
| *H04B 5/00* | (2006.01) |

(52) U.S. Cl.
CPC ......... *G06K 7/143* (2013.01); *G06K 19/0672* (2013.01); *G06K 19/07758* (2013.01); *H04B 5/0031* (2013.01); *H04B 5/0062* (2013.01)

(58) Field of Classification Search
CPC ............. G06K 19/04; G06K 19/06046; G06K 17/0029

USPC ........................ 235/494, 492, 462.46, 472.02
See application file for complete search history.

(56) References Cited

U.S. PATENT DOCUMENTS

| | | | | |
|---|---|---|---|---|
| 2009/0112147 | A1* | 4/2009 | Kassem | A61M 27/008 604/9 |
| 2009/0224883 | A1* | 9/2009 | Angell | G06K 7/10019 340/10.1 |
| 2013/0015248 | A1* | 1/2013 | Perret | G06K 19/0672 235/492 |
| 2018/0114041 | A1* | 4/2018 | Bai | H01P 1/20381 |

FOREIGN PATENT DOCUMENTS

| | | |
|---|---|---|
| CN | 208705916 U | 4/2019 |
| WO | 2018218313 | 12/2018 |

* cited by examiner

*Primary Examiner* — Daniel St Cyr
(74) *Attorney, Agent, or Firm* — Mueting Raasch Group

(57) ABSTRACT

Embodiments described herein include a chipless patterned conductor, comprising one or more glyphs. Each glyph comprises a disk and a ring structure including at least one ring surrounding the disk. One or more of a spacing between the disk and the at least one ring and a width of the at least one ring is configured to determine a characteristic resonant frequency of the glyph. At least one notch is disposed in at least one of the disk and at least one ring of the ring structure. The at least one notch is configured such that the magnitude of resonances in the glyph are dependent on polarization direction.

20 Claims, 18 Drawing Sheets

CHIPLESS RFID TAG USING HYBRID CODING

TECHNICAL FIELD

The present disclosure is directed to radio frequency identification (RFID).

BACKGROUND

The radio frequency identification (RFID) tag is a type of identification device. When interrogated by a reading device which is also called an interrogator, RFID tags reflect or retransmit a radio frequency signal to return an encoded identification (ID) to the interrogator. RFID tag devices may be of two basic types. Chipped RFID tags include a microchip that stores data. Chipless RFID tags do not contain a microchip but instead rely on magnetic materials or transistorless thin film circuits to store data.

SUMMARY

Embodiments described herein involve a chipless patterned conductor comprising one or more glyphs. Each glyph comprises a disk and a ring structure comprising at least one ring surrounding the disk. One or more of a spacing between the disk and the at least one ring and a width of the at least one ring is configured to determine a characteristic resonant frequency of the glyph. At least one notch is disposed in at least one of the disk and at least one ring of the ring structure. The at least one notch is configured such that the magnitude of resonances in the glyph are dependent on polarization direction.

A method of forming a chipless patterned conductor comprises forming at least one glyph. The at least one glyph is formed by forming a disk and forming a ring structure comprising least one ring surrounding the disk. One or more of a spacing between the disk and the at least one ring and a width of the at least one ring is configured to determine a characteristic resonant frequency of the glyph. At least one notch is formed in at least one of the disk and at least one ring of the ring structure. The at least one notch is configured such that the magnitude of resonances in the glyph are dependent on polarization direction.

A system for reading a patterned conductor comprises
21. A system for reading a patterned conductor comprising a transmitter configured to transmit an electromagnetic radiation signal towards the patterned conductor, the patterned conductor comprising one or more glyphs. Each glyph comprises a disk and a ring structure comprising at least one ring surrounding the disk. One or more of a spacing between the disk and the at least one ring and a width of the at least one ring is configured to determine a characteristic resonant frequency of the glyph. At least one notch is disposed in at least one of the disk and at least one ring of the ring structure. The at least one notch is configured such that the magnitude of resonances in the glyph are dependent on polarization direction. Each glyph is configured to backscatter at least a portion of the electromagnetic radiation based on the characteristic resonant frequency and the magnitude of resonances. A receiver is configured to receive a backscattered signal. A processor is configured to associate the backscattered signal with a digital signature.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Radio frequency identification (RFID) technologies have many different applications. Chipless RFID is a wireless data capturing technique applying electromagnetic waves to extract the encoded data in a tag. Chipless RFID tags have the potential to replace barcode. There is potential to enhance the performance of chipless RFID in terms of increasing encoding capacity, simplifying fabrication, and lowering costs.

According to embodiments described herein, the coding efficiency of chipless RFID may be improved by using a hybrid encoding technique by combining polarization sensitivity with multiple frequency encoding in a single conductive glyph. According to embodiments described herein this is done in the millimeter-wave (mm-wave) regime, though the technique is not limited to this frequency range and higher or lower frequencies can also be used. One motivation of this design is to improve the coding efficiency of chipless RFID tags. In general, there are different methods to increase the coding capacity in a RFID tag design process. Some embodiments involve the integration of multiple simple glyphs where each glyph can hold few bits. Increasing the capacity of each single glyph increases the capacity of the full tag by extension.

According to embodiments described herein data can be encoded a within a frequency band by creating some resonances in the backscattered signal at certain frequencies. Embodiments described herein are based on the concept of slot ring resonators where all rings have a common center creating a concentric configuration. To do so, the slot ring resonators with various diameters are designed to encode different frequency signatures in which each signature represents a bit. Harmonic resonances are not observed in the backscattered signal as the current paths of the even and odd harmonics are canceled due to the symmetric configuration of the design. Therefore, the complete frequency band can be used to encode data. To add polarization diversity to the designed tag, two symmetric rectangular notches are created in the inner circular disk and/or in one or more of the rings. According to embodiments described herein, the hybrid tag may not have a ground plane and therefore the field lines are not concentrated into the substrate.

Figure 1A:
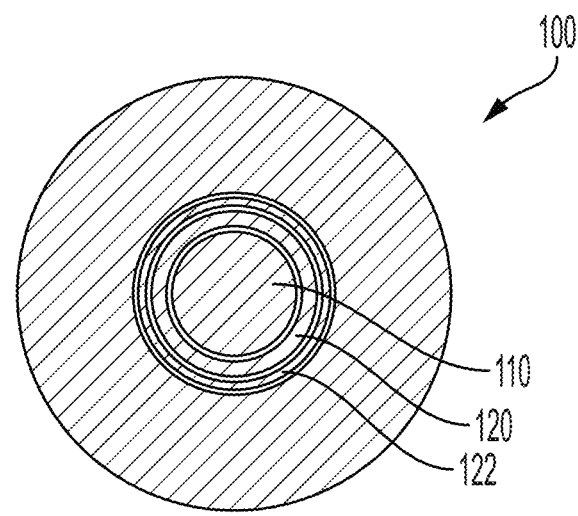
FIGS. 1A and 1B illustrate example glyphs in accordance with embodiments described herein.

A patterned conductor comprises one or more glyphs in accordance with embodiments described herein. The glyph is a patterned conductive material disposed on a dielectric substrate. According to some embodiments, the reverse side of the substrate has a continuous conductor (e.g., a "ground plane"). FIG. 1A illustrates an example of a glyph 100. The glyph 100 includes a disk 110 having two rings 120, 122 surrounding the disk. According to embodiments described herein, at least one ring and a width of the at least one ring is configured to determine a characteristic resonant frequency of the glyph.

Figure 1B:
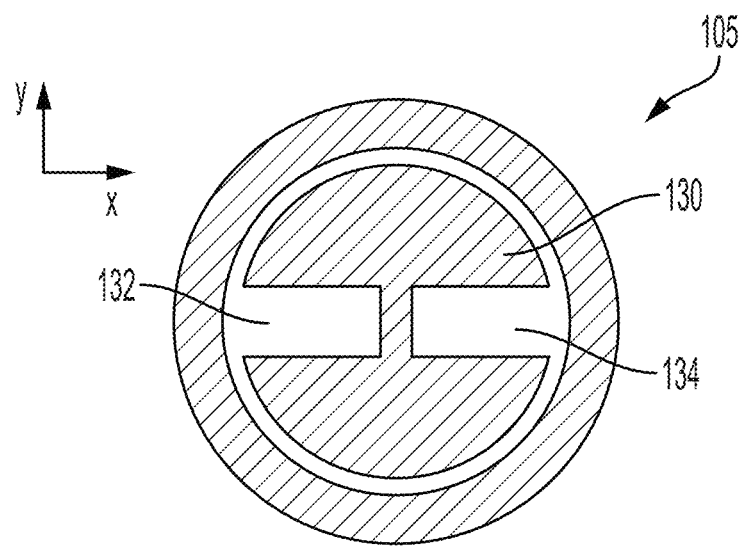

FIG. 1B illustrates an example of a glyph 105 in accordance with embodiments described herein. The glyph 105 of FIG. 1B includes a disk 130 with two notches 132, 134. According to various implementations, the notches 132, 134 are configured such that the magnitude of resonances in the glyph are dependent on polarization direction.

According to various embodiments, a patterned conductor can be printed that is sensitive to both polarization and frequency. The hybrid (polarization and frequency) configuration may enhance the coding efficiency and working in the mm-wave regime brings the advantage of a smaller glyph size. According to embodiments described herein, the patterned conductor comprises one or more glyphs that are placed in a credit card size (e.g., 85.60×53.98 mm) tag to increase the total coding efficiency. Both larger and smaller size tags are also realizable. In some cases, the hybrid tag doesn't need a ground plane which results in simplifying and reducing the cost of fabrication. Embodiments described herein may involve a patterned conductor that can radiate without a ground plane because the rings serve as counter electrodes for the central notched disk and the wave is guided between two strips or within the notch width.

Figure 1C:
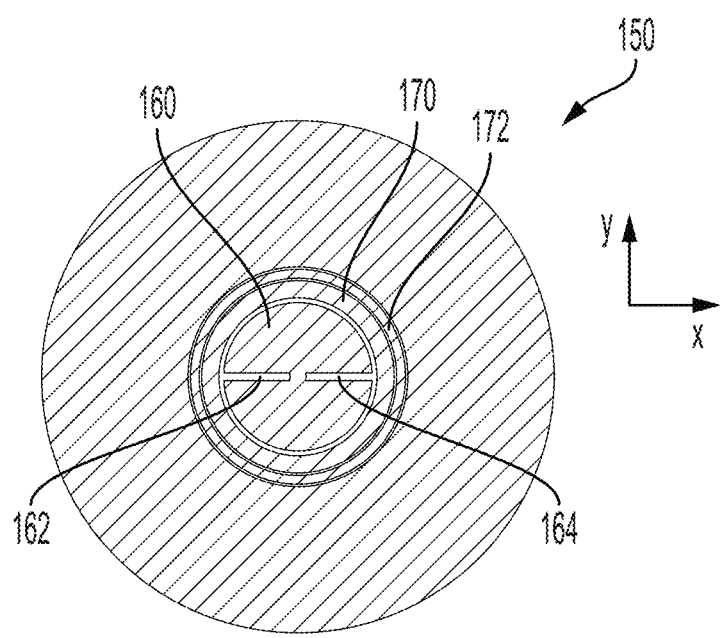
FIGS. 1C and 1D show examples of hybrid glyphs having both a notched disk and rings surrounding the notched disk in accordance with embodiments described herein.
Figure 1D:
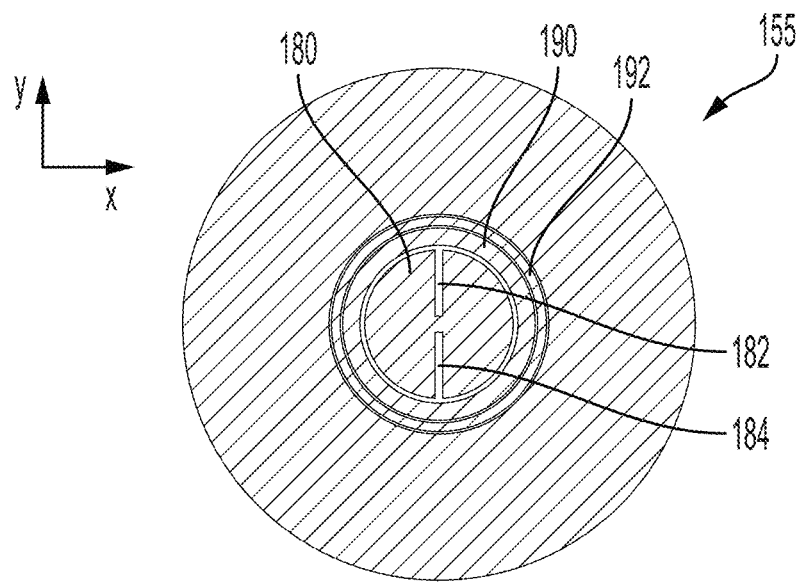

According to embodiments described herein, a simple glyph includes a notched circular patch surrounded by a slot ring. FIGS. 1C and 1D show examples of glyphs having both a notched disk and rings surrounding the notched disk. Specifically, FIG. 1C shows a glyph 150 having both frequency diversity and polarization where frequency diversity is defined as having multiple resonant frequencies.

The glyph 150 has a disk 160 with two notches 162, 164. In this example, the notches 162, 164 are disposed on opposite sides of the disk 160 and are oriented to correspond to X-polarization, but Y-polarization is doable by rotating the tag for 90° as shown in FIG. 1D. Two rings 170, 172 surround the notched disk 160. FIG. 1D illustrates another glyph 155 having both frequency diversity and polarization diversity. The glyph 155 has a disk 180 with two notches 182, 184. The notches 182, 184 are disposed on opposite sides of the disk 180. Two rings 190, 192 surround the notched disk 180. While the examples shown in FIGS. 1C and 1D show a disk having two notches and two rings, it is to be understood that there can be more or fewer notches and more or fewer rings.

Figure 2A:
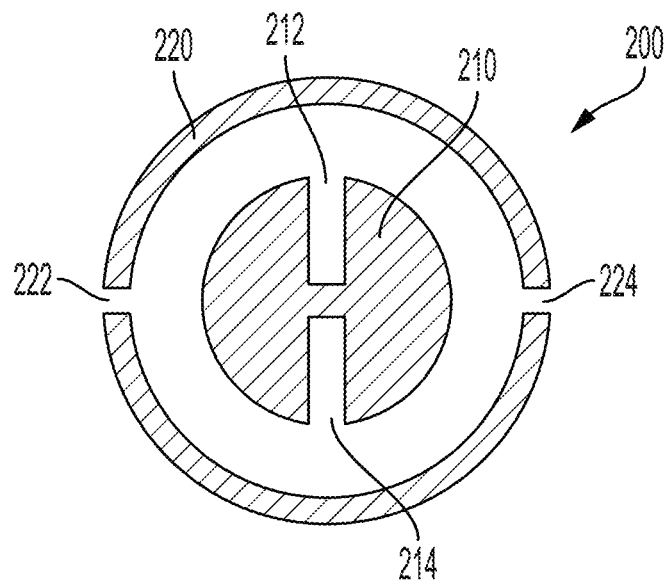
FIGS. 2A-2C illustrate examples of a glyph in which one or more of the rings has at least one notch in accordance with embodiments described herein.
Figure 2B:
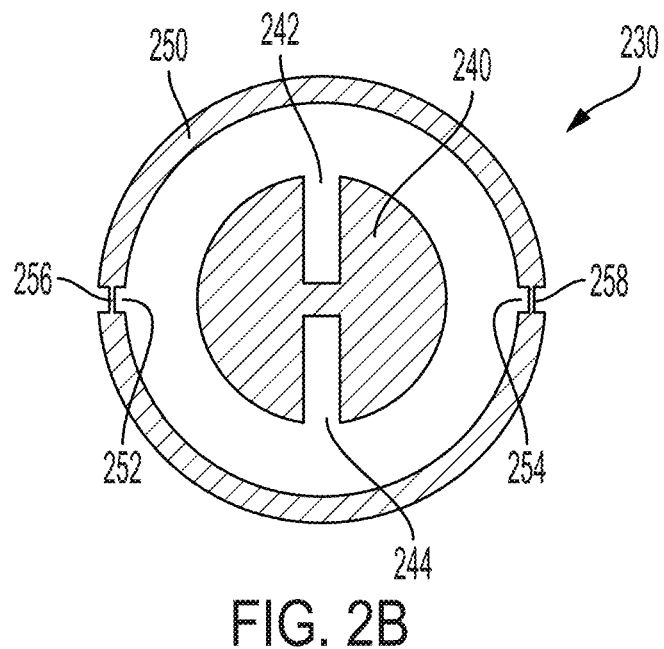
Figure 2C:
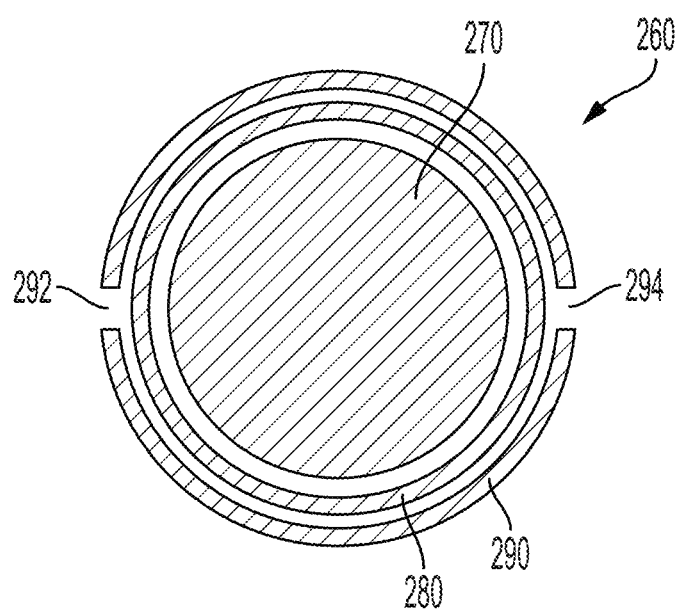

According to some embodiments, the disk is not notched and/or one or more of the slot rings includes an opening and/or a notch. FIG. 2A illustrates an example of a glyph 200 that includes a disk 210 having two notches 212, 214. The disk 210 is surrounded by a ring 220 having two notches 222, 224 completely through the ring 220. In this example the notches 212, 214 in the disk 210 are in a Y-orientation and the notches 222, 224 in the ring 220 are in an X-orientation. In some configurations, the number of notches in the disk 210 and the number of notches in the ring 220 may be different. FIG. 2B shows a glyph 230 having a disk 240 with two notches 242, 244 in a Y-orientation. The disk 240 is surrounded by a ring 250 having two notches 252, 254 that do not go completely through the ring 250. FIG. 2C illustrates an example of a glyph 260 that includes a disk 270. The disk 270 is surrounded by an inner ring 280 and an outer ring 290. The outer ring 290 has two notches 292, 294 that go completely through the outer ring 290. While the example of FIG. 2C shows notches in the outer ring, it is to be understood that the notches could be disposed in the inner ring 280 or in the inner ring 280 and the outer ring 290.

Figure 3A:
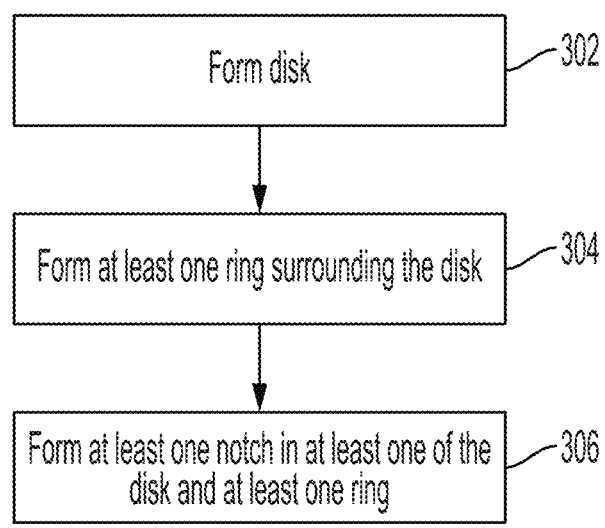
FIG. 3A shows a process for forming a chipless patterned conductor in accordance with embodiments described herein.

FIG. 3A shows a process for forming a chipless patterned conductor in accordance with embodiments described herein. A disk is formed 302. At least one ring surrounding the disk is formed 304. One or more of a spacing between the disk and the at least one ring and a width of the at least one ring is configured to determine a characteristic resonant frequency of the glyph. At least one notch is formed 306 in at least one of the disk and at least one ring of the ring structure. The at least one notch is configured such that the magnitude of resonances in the glyph are dependent on polarization direction.

The patterned conductor may be configured to operate in any frequency band including C band (4-8 GHz), X band (8-12 GHz), Ku, K and Ka (12-40 GHz), Q band (33-50), V band (50-75 GHz), and/or W band (75-110 GHz). While specific frequency ranges are included here, it is to be understood that the frequency range may be greater than 110 GHz and/or lower than 4 GHz.

According to embodiments described herein, the at least one glyph is formed on a substrate and the at least one glyph with the substrate is transferred to an object, e.g., a box. For example, the substrate may be a sticker that can be transferred to the object. According to various implementations, the glyph is formed directly on an object. For example, the glyph may be formed on a package, a paper cup, a pallet, and/or an article of clothing. The at least one glyph may be formed by printing the at least one glyph from a conductive material. For example, the glyph may be fabricated from printed inks comprising one or more of silver and copper. In some cases, the printed inks could include one or more of nickel, carbon, carbon nanotubes, and silver nanowires. According to various configurations, a post-printing annealing process takes place. According to various embodiments, the glyph is fabricated by etching metal on a dielectric substrate. For example, the glyph may be fabricated by etching one or more of copper and aluminum. The glyph may be fabricated by etching a transparent conductor such as indium-tin oxide, for example. In some implementations, the glyph is fabricated with a thermal transfer process using conductive ribbons of one or more of copper, aluminum, gold, and/or silver, for example. According to some embodiments, the glyph is fabricated through vapor deposition. For example, the glyph may be fabricated using a sputtering and/or a thermal evaporation process. In any of these processes the substrate onto which the conductor is patterned may be a high-performance dielectric such as Taconic TLX-8, a low cost polymer such as mylar, polyethylene tetraphthalate (PET) and/or polyethylene naphthalate (PEN,) and/or another substrate material such as polyimide, glass or paper, and/or any of the above pre-coated on the reverse side with a conductive film.

While various techniques are described herein that can be used to form the patterned conductor, it is to be understood that any technique can be used alone or in combination with any other process.

Figure 3B:
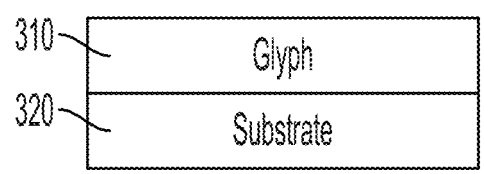
FIGS. 3B and 3C illustrate examples of a glyph disposed on a substrate in accordance with embodiments described herein.
Figure 3C:
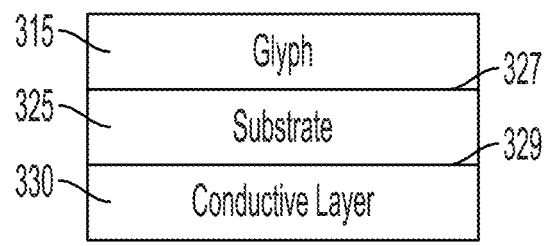

In some configurations, the at least one glyph is formed from a conductive foil and the at least one glyph 310 is transferred to a substrate 320 as shown in FIG. 3B. According to various implementations, the substrate 325 has a first side 327 and an opposing second side 329. A conductive layer 330 disposed on the second side 329 of the substrate 325 and the glyph 315 is transferred to the first side 327 of the substrate 325, as shown in FIG. 3C. According to various configurations, the conductive layer is a ground plane.

Figure 3D:
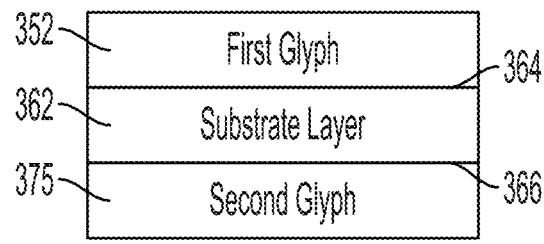
FIGS. 3D and 3E illustrate embodiments having more than one glyph in accordance with embodiments described herein.
Figure 3E:
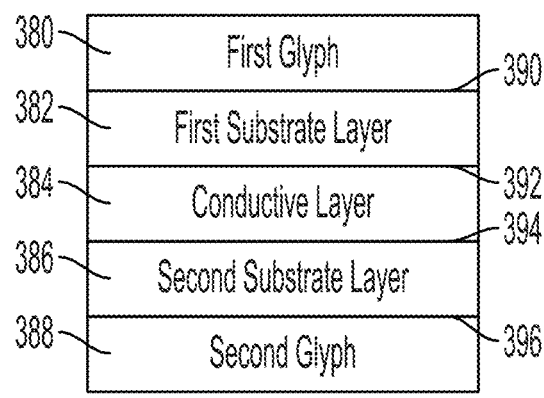

FIG. 3D illustrate an embodiment having more than one glyph in accordance with embodiments described herein. FIG. 3D shows a substrate layer 362 having a first side 364 and an opposing second side 366. A first glyph 352 is disposed on the first side 364 of the substrate layer 362 and a second glyph 372 is disposed on the second side 366 of the substrate layer 362. FIG. 3E shows another example having more than one glyph. A first glyph 380 is disposed on a first side 392 of a first substrate layer 382. A conductive layer 384 is disposed between a second side 392 of the first substrate layer 392 and a first side 394 of a second substrate layer 386. A second glyph 388 is disposed on the second side 396 of the second substrate layer 386.

Figure 4A:
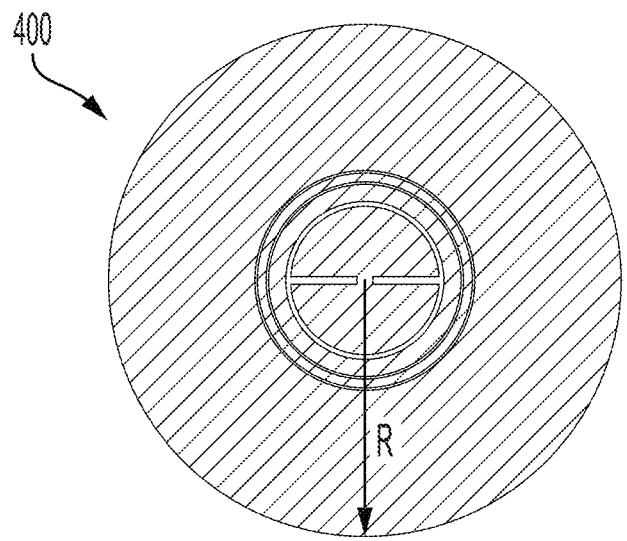
FIGS. 4A and 4B show a more detailed view of a hybrid glyph in accordance with embodiments described herein.
Figure 4B:
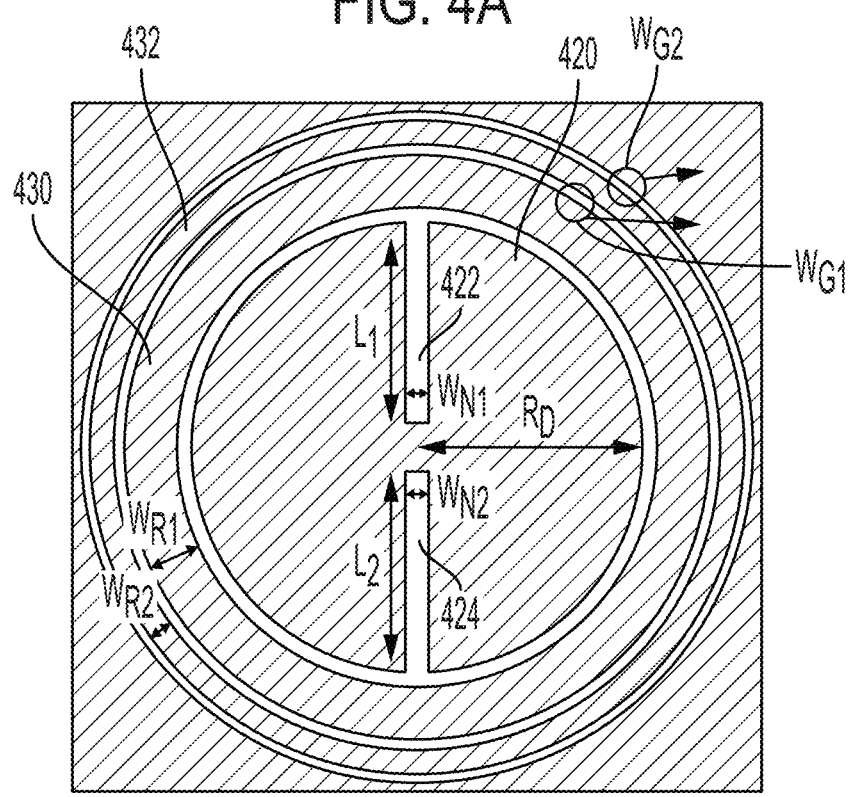

FIGS. 4A and 4B show a more detailed view of a hybrid glyph in accordance with embodiments described herein. The glyph 400 has a radius, R, in a range of about 1.5 mm to about 2.5 mm. According to various implementations, R is about 1.5 mm. In some cases, R is less than 1.5 mm or greater than 2.5 mm.

The disk 420 has a radius, $R_D$, in a range of about 0.4 mm to about 0.8 mm. According to various implementations, $R_D$ is about 0.45 mm. In this example, the disk has a first notch 422 and a second notch 424. The first notch 422 has a length, $L_1$ and a width $W_{N1}$. The second notch 424 has a length, $L_2$ and a width $W_{N2}$. According to embodiments described herein $W_{N1}$ is substantially equal to $W_{N2}$ and/or $L_1$ is substantially equal to $L_2$. In some cases, $L_1$ is a different value than $L_2$ and/or $W_{N1}$ is a different value than $W_{N2}$. According to embodiments described herein $L_1$ and $L_2$ are in a range of about 0.4 mm to about 0.795 mm. According to various implementations, $L_1$ and/or $L_2$ is about 0.405 mm. According to embodiments described herein, $W_{N1}$ and $W_{N2}$ are in a range of about 0.1 mm to about 0.6 mm. According to various implementations, $W_{N1}$ and/or $W_{N2}$ is about 0.05 mm.

A first ring 430 and a second ring 432 surround the disk 420. The first ring 430 has a width, $W_{R1}$ in a range of about 0.05 mm to about 0.1 mm. According to various implementations, $W_{R1}$ is about 0.105. The second ring 432 has a width, $W_{R2}$ in a range of about 0.04 mm to about 0.08 mm. According to various implementations, $W_{R2}$ is about 0.0495. In some cases, $W_{R1}$ is substantially equal to $W_{R2}$. A first gap has a width, $W_{G1}$ in a range of about 0.025 mm to about 0.05 mm. A second gap has a width, $W_{G2}$ in a range of about 0.018 mm to about 0.03 mm. According to various implementations, $W_{G1}$ is about 0.025 mm and/or $W_{G2}$ is about 0.018 mm. In some cases, $W_{G1}$ is substantially equal to $W_{G2}$.

According to embodiments described herein, at least one of the dimensions of the glyph are selected according to an optimization process. For example, the dimensions may be selected to have a resonance at a specific frequency. This may be accomplished by determining one or more of an approximate radius of the disk using Equation (1), where widths of the notches, and/or the widths of the rings are determined through an optimization process.

$$a = \frac{1.8412c}{2\pi f_r \sqrt{\varepsilon_r}} \quad (1)$$

Here, c is the speed of light in free space, $f_r$ is the design resonant frequency and $\varepsilon_r$ is the dielectric constant of the substrate used for design.

The glyph is then designed using the estimated dimensions. A simulation is performed using available commercial electromagnetic simulation tools and the frequency behavior of the design is monitored. The dimensions are then tuned to get resonance at the desired frequencies.

Figure 5:
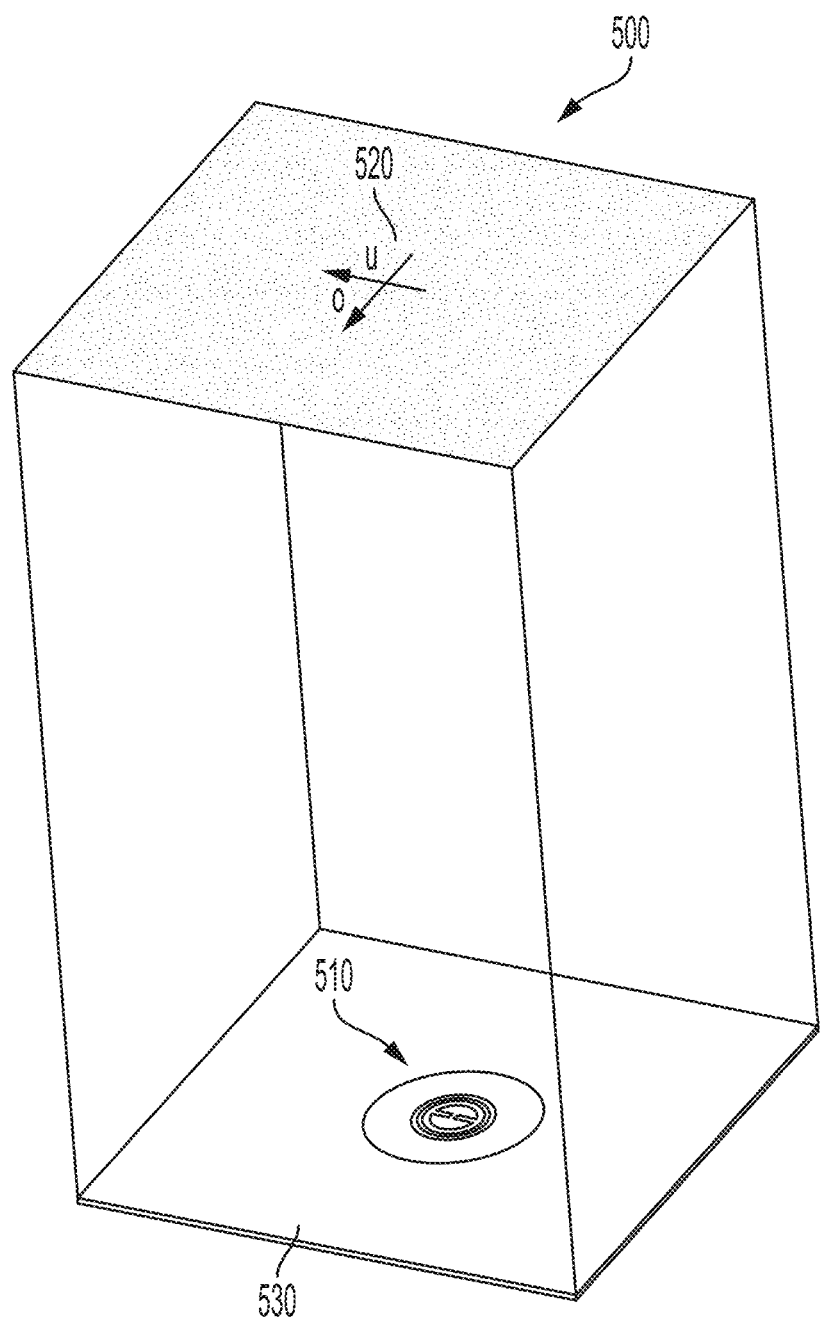
FIG. 5 shows a simulation setup for the hybrid chipless patterned conductor in accordance with embodiments described herein.

FIG. 5 shows a simulation setup 500 for the hybrid chipless patterned conductor in accordance with embodiments described herein. A linearly polarized plane wave 520 is used for excitation of the patterned conductor 510. To monitor the backscattered electric field, far-field one or more probes may located at a specified distance away from the patterned conductor 510. For example, the probes may be located about 10 cm away from the patterned conductor 510. The tag is disposed on a substrate 530. For example, the tag may be disposed on a 5 mil Taconic TLX-8 substrate with permittivity, εr, of about 2.55 and loss, δ, of about 0.0017.

An optimization process may be run to optimize the size of the rings and the notched disk to have resonances at the desired frequency.

Figure 6:
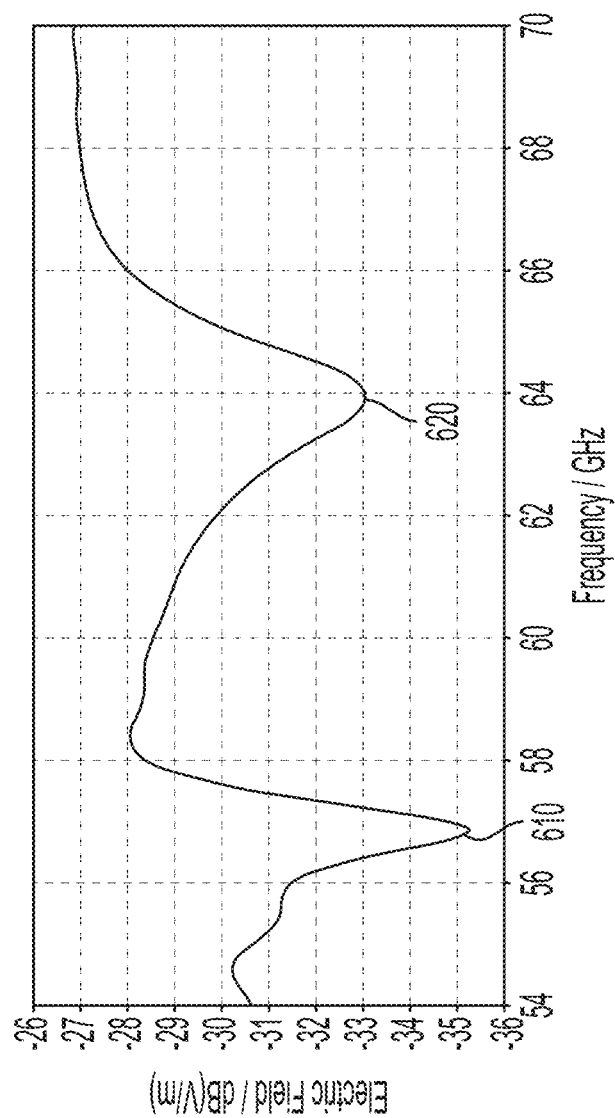
FIG. 6 illustrates deep notches that are observed at the resonance frequencies of the ring resonators in accordance with embodiments described herein.

When a plane wave impinges the rings shown in FIG. 1A, a frequency selective behavior with peaks followed by deep notches are observed at the resonance frequencies of the ring resonators as depicted in FIG. 6 where two deep notches 610, 620 are observed. The first resonance 610 occurs at about 57 GHz which relates to the bigger ring 122. The second resonance 620, which is due to the smaller ring 120 happens at about 64 GHz. The inner circular disk 110 falls outside the desired frequency band, therefore those two resonances are just due to the rings.

Figure 7A:
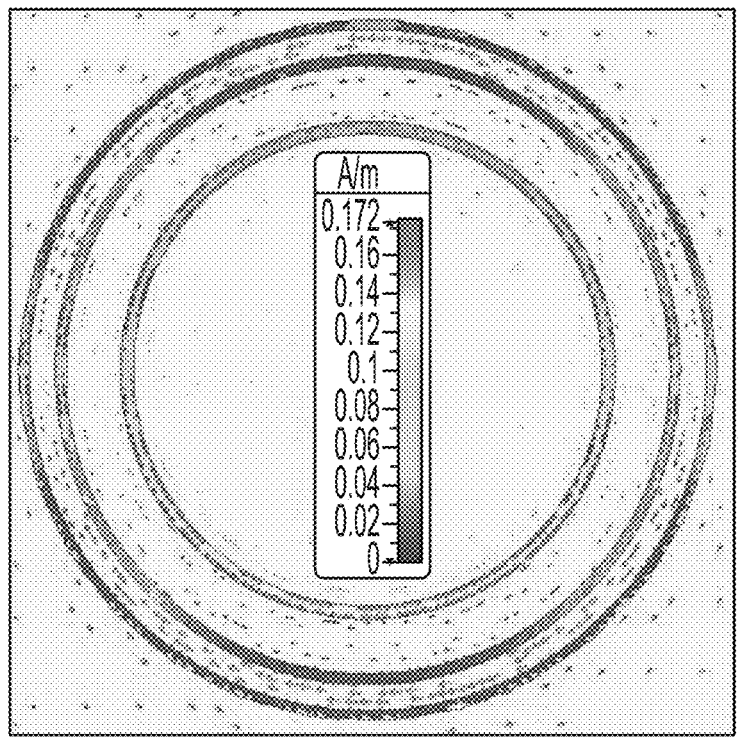
FIG. 7A shows the surface current distribution at about 57 GHz of the configuration shown in FIG. 1A in accordance with embodiments described herein.
Figure 7B:
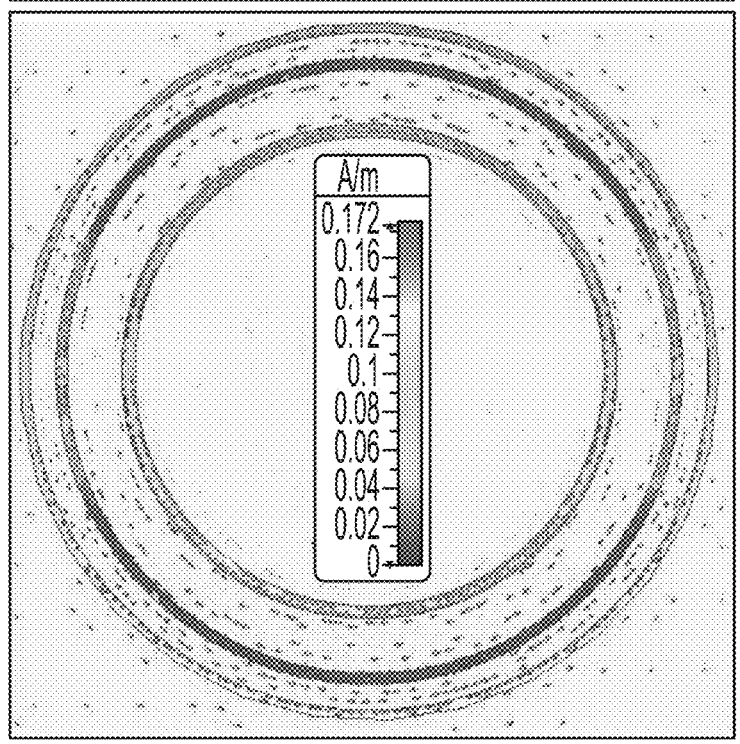
FIG. 7B illustrates the surface current distribution at about 64 GHz of the configuration shown in FIG. 1A in accordance with embodiments described herein.

The surface current distribution at about 57 GHz of the configuration shown in FIG. 1A is illustrated in FIG. 7A. FIG. 7B illustrates the surface current distribution at about 64 GHz of the configuration shown in FIG. 1A. FIGS. 7A and 7B show the relationship between the coupling of the adjacent slots and the resonances. It can be observed that the current density vector of adjacent slots is opposite and generates magnetic resonance. The width of the slots influences the coupling strength and the resonance frequency. The smaller slot width is shifting down the resonance frequency while a larger slot width results in shifting up the resonances.

Figure 8:
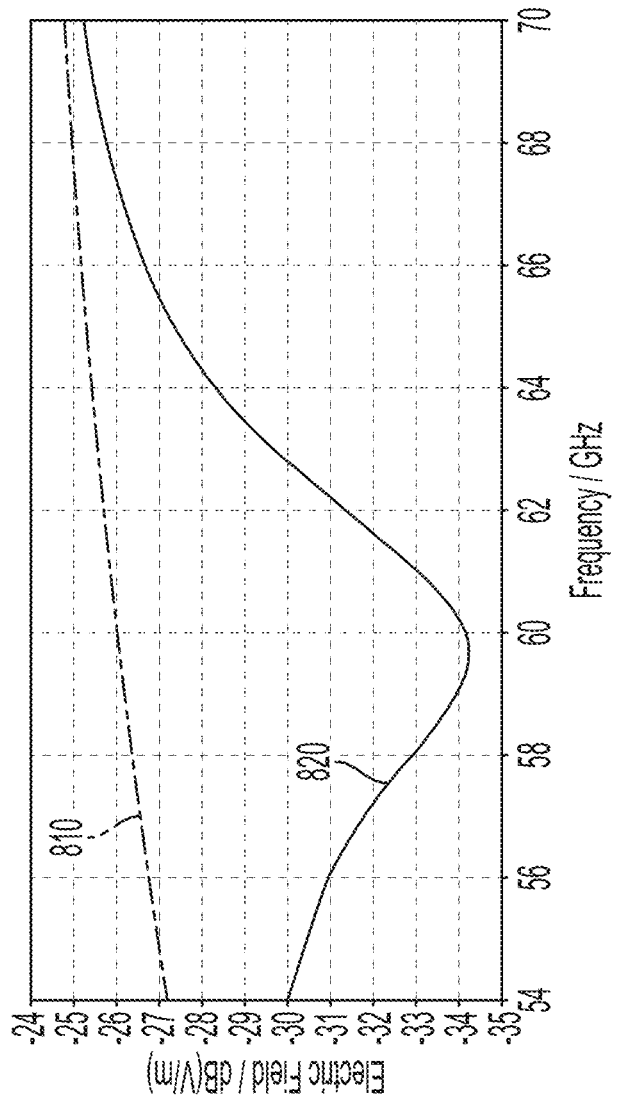
FIG. 8 shows the simulation results of the backscattered electric field of the patterned conductor of FIG. 1B excited by an X-polarized plane for notches oriented horizontally as in FIG. 1C and notches rotated 90° and oriented vertically as in FIG. 1D in accordance with embodiments described herein.
Figure 9:
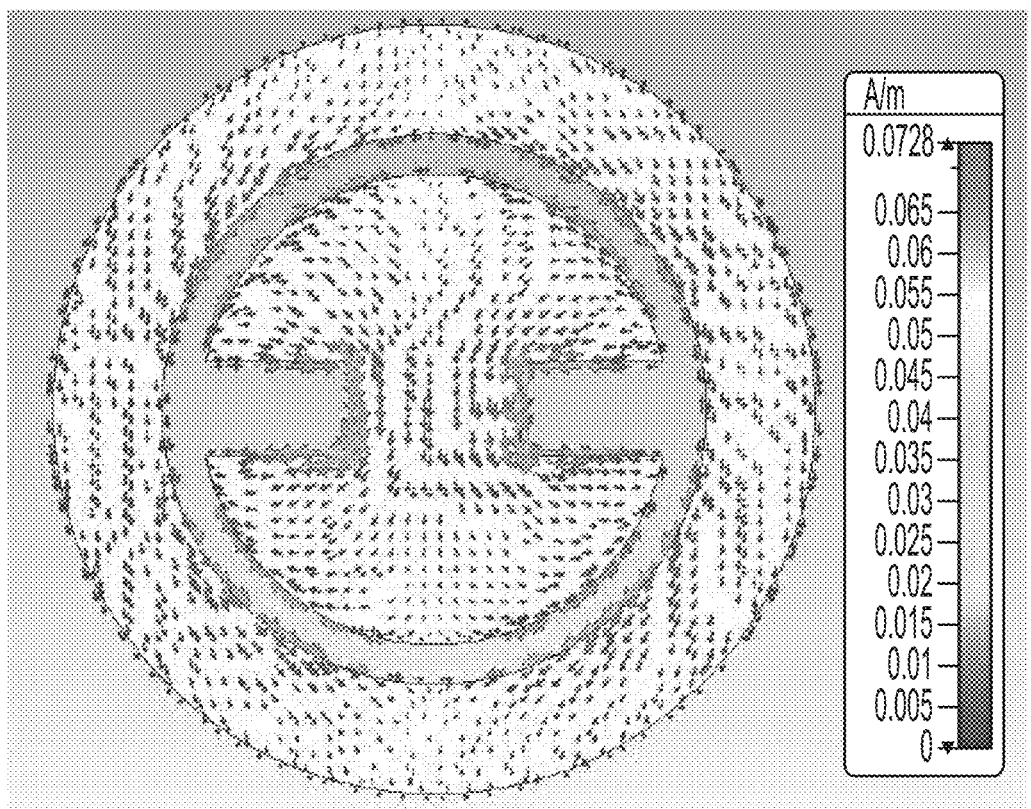
FIG. 9 illustrates the surface current distribution at about 60 GHz of the configuration shown in FIG. 1B in accordance with embodiments described herein.

FIG. 8 shows the simulation results of the backscattered electric field of the patterned conductor of FIG. 1B excited by an X-polarized plane for notches oriented horizontally 810 as in FIG. 1C and notches rotated 90° and oriented vertically 820 as in FIG. 1D. The surface current distribution at about 60 GHz of the configuration shown in FIG. 1B is shown in FIG. 9.

Figure 10:
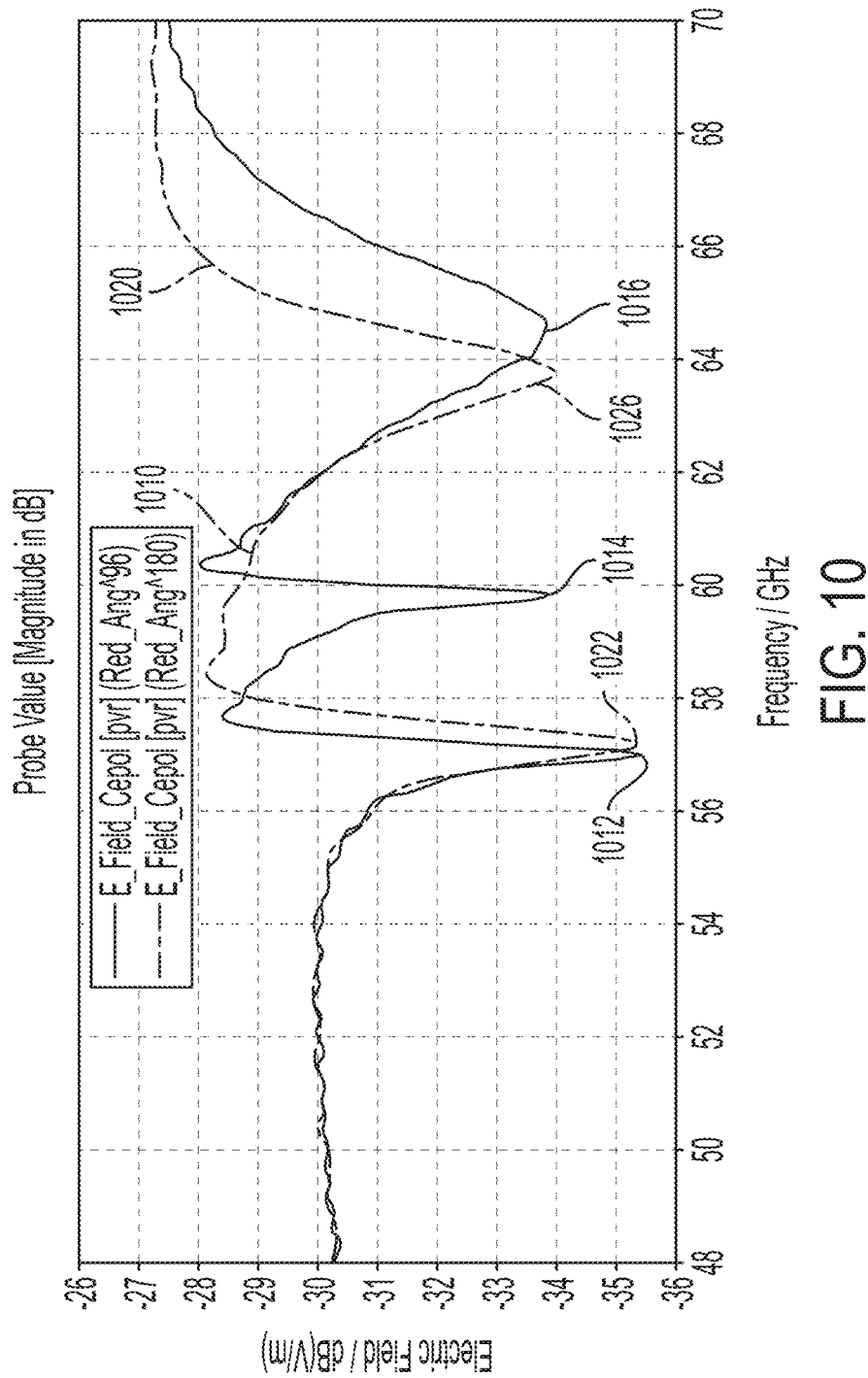
FIG. 10 show the simulation results of the backscattered electric field for a patterned conductor having notches are perpendicular to the direction of the incident electric field (90° rotation) as in FIG. 1C and for a patterned conductor having notches that are oriented the same direction as the incident electric field (180° rotation) as in FIG. 1D in accordance with embodiments described herein.

FIG. 10 shows the simulation results of the backscattered electric field for a patterned conductor having a glyph with notches that are perpendicular 1010 to the direction of the incident electric field (90° rotation) as in FIG. 1C and for a patterned conductor having a glyph with notches that are oriented the same direction 1020 as the incident electric field (180° rotation) as in FIG. 1D. In the case 1010 where the notches are oriented perpendicularly to the incident electric field, three resonances 1012, 1014, 1016 are observed in the monitored frequency band. The resonances at 57 GHz 1012 and at 64 GHz 1016 are due to the rings and the resonance observed at 60 GHz 1014 is the effect of the notched disk. In the case 1020 where the notches are oriented in the same direction as the incident electric field, only the resonances 1022, 1026 that are due to the rings are observed.

Binary data can be coded by the presence or the absence of the resonances. For example, the removal of a notch and/or the removal of a ring can be denoted as logic "0" where the appearance of a notch is denoted as logic "1". This is just one example of how logic can be encoded in the patterned conductor. Here, it is shown that each glyph of the patterned conductor can represent 3 bits for each of the three resonances. The number of combinations that can be encoded for each glyph using both frequency and polarization diversity is equal to 8. In a credit card size chipless tag the minimum number of glyphs, considering enough separation between each, is 40 glyphs. Therefore, the tag has the ability to store 120 bits of data.

Figure 11A:
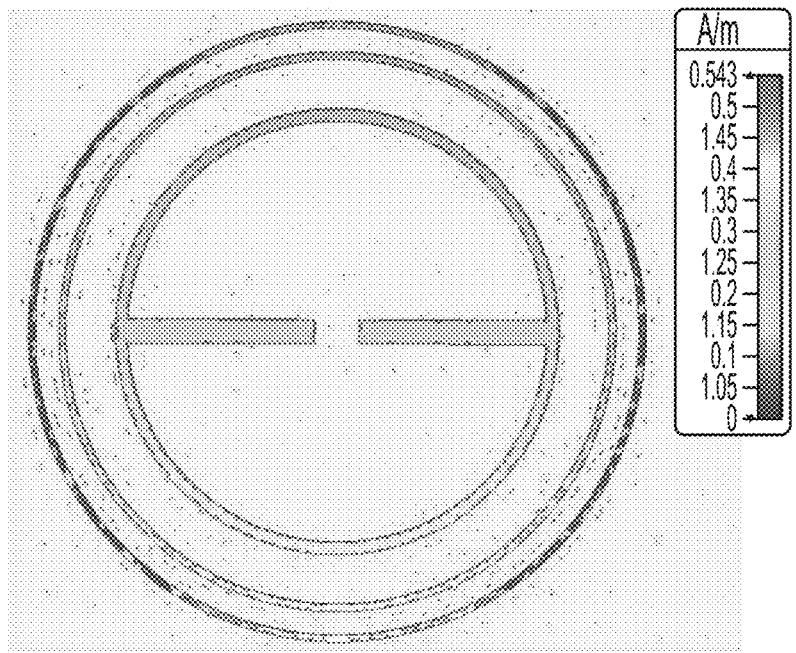
FIG. 11A illustrates the surface current distribution at about 57 GHz for the hybrid glyph in accordance with embodiments described herein.
Figure 11B:
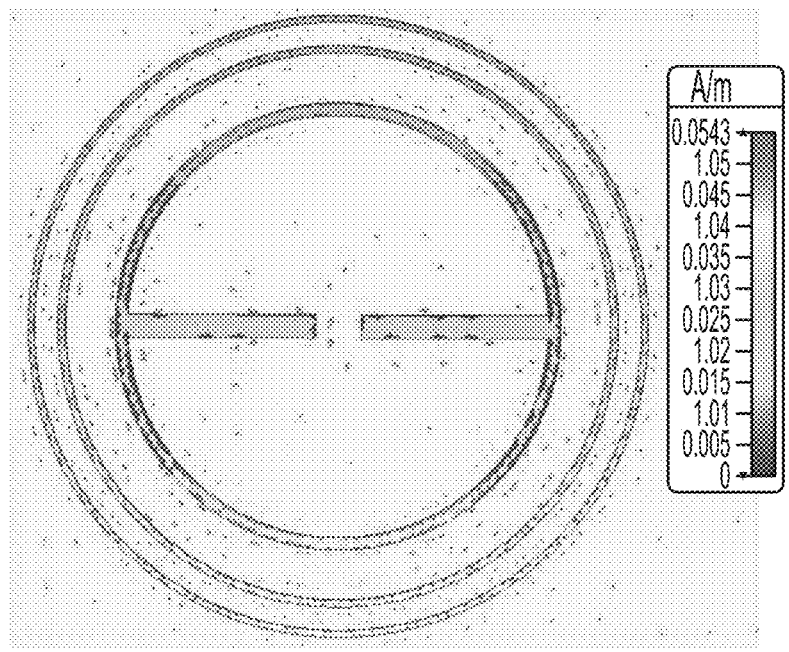
FIG. 11B illustrates the surface current distribution at about 60 GHz for the hybrid glyph in accordance with embodiments described herein.
Figure 11C:
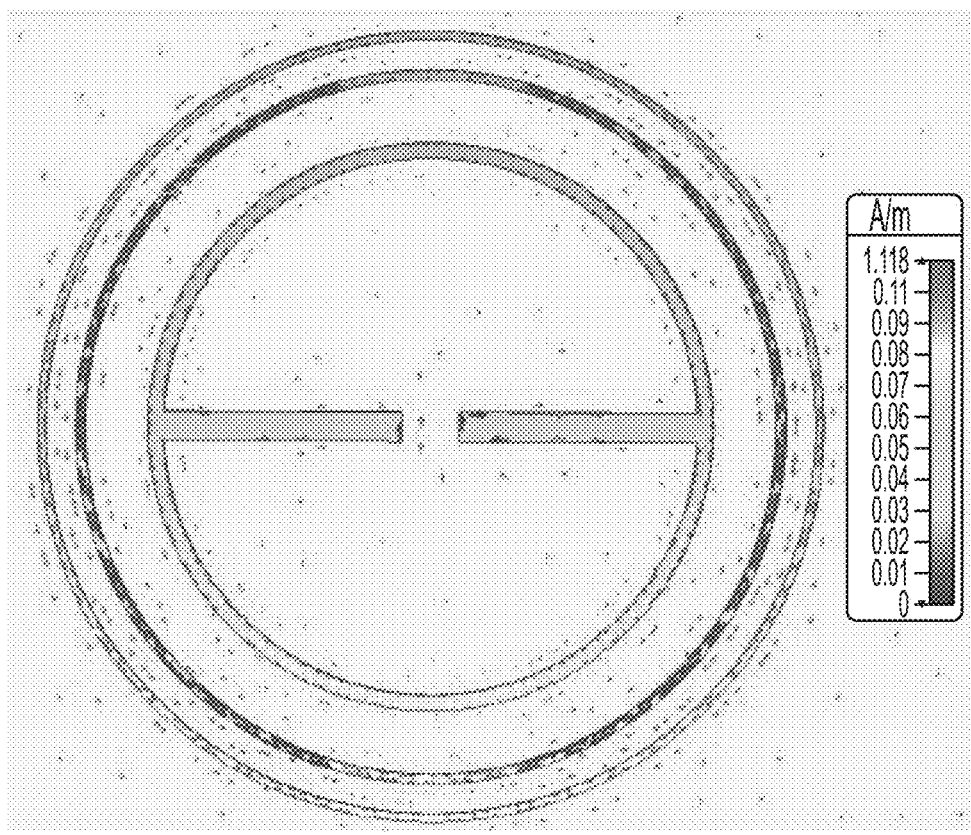
FIG. 11C illustrates the surface current distribution at about 64 GHz for the hybrid glyph in accordance with embodiments described herein.

FIGS. 11A-11C show the surface current distribution at the resonant frequencies for the hybrid configuration shown in FIG. 1C where the notches are oriented perpendicularly to the incident electric field. Specifically, FIG. 11A illustrates the surface current distribution at about 57 GHz, FIG. 11B illustrates the surface current distribution at about 60 GHz, and FIG. 11C illustrates the surface current distribution at about 64 GHz.

Figure 12:
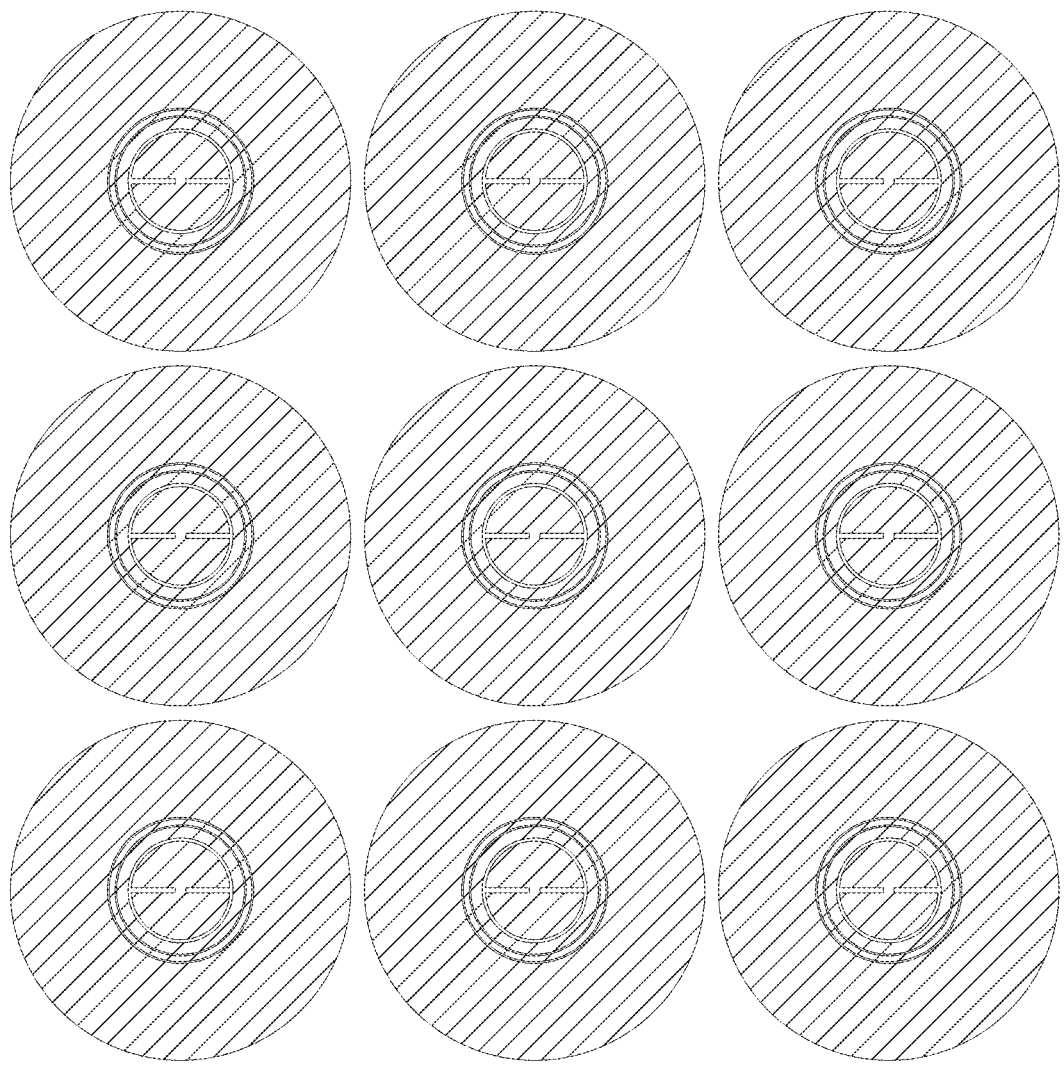
FIG. 12 illustrates an example array of glyphs in accordance with embodiments described herein.

According to embodiments described herein, a chipless RFID tag comprises an array of patterned conductors. FIG. 12 illustrates an example array of patterned conductors. The array of patterned conductors may have one or more glyphs of varying ring sizes, ring spacings, and/or notch orientations.

Figure 13:
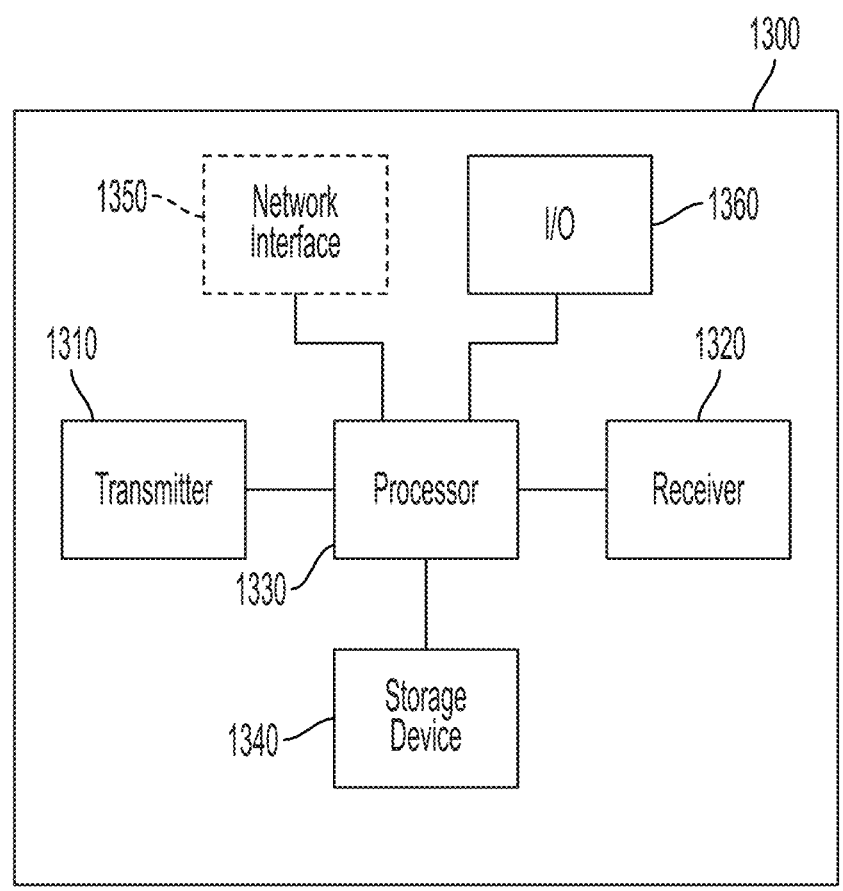
FIG. 13 shows a block diagram of an RFID system capable of implementing embodiments described herein.

FIG. 13 shows a chipless RFID system 1300 that is configured to read the one or more patterned conductors. A transmitter configured to transmit an electromagnetic radiation signal towards the patterned conductor. The system includes a receiver configured to receive a backscattered signal. A processor coupled to the receiver is configured to associate the backscattered signal with a digital signature using information stored in a storage device 1340. The RFID system 1300 may include one or more network interfaces 1350 for communicating with other devices via a network. The system may include other input/output devices 1360 that enable user interaction with the system 1300 (e.g., display, keyboard, mouse, speakers, buttons, etc. FIG. 13 is a high level representation of possible components of a RFID system for illustrative purposes. It is to be understood that the RFID system shown in FIG. 13 may contain other components.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art.

The foregoing description of the example embodiments have been presented for the purposes of illustration and description. It is not intended to be exhaustive or to limit the inventive concepts to the precise form disclosed. Many modifications and variations are possible in light of the above teachings. Any or all features of the disclosed embodiments can be applied individually or in any combination, not meant to be limiting but purely illustrative. It is intended that the scope be limited by the claims appended herein and not with the detailed description.

What is claimed is:

1. A chipless patterned conductor, comprising:
   one or more glyphs, each glyph comprising:
   a disk;
   a ring structure comprising at least one ring surrounding the disk, the at least one ring comprising a first ring surrounding the disk and a second ring surrounding the disk, the second ring configured to serve as a counter electrode for the first ring and the disk, wherein one or more of a spacing between the disk and the at least one ring and a width of the at least one ring is configured to determine a characteristic resonant frequency of the glyph; and at least one notch in at least one of the disk and at least one ring of the ring structure, the at least one notch configured such that the magnitude of resonances in the glyph are dependent on polarization direction.

2. The chipless patterned conductor of claim 1, wherein the ring structure is configured to resonate in a band of about 40 GHz to about 75-110 GHz.

3. The chipless patterned conductor of claim 1, wherein a width of the first ring is different than a width of the second ring.

4. The chipless patterned conductor of claim 1, wherein a width of the first ring is substantially the same as the width of the second ring.

5. The chipless patterned conductor of claim 1, wherein a spacing between the first ring and the disk is different than a spacing between the second ring and the disk.

6. The chipless patterned conductor of claim 1, wherein the disk has two notches.

7. The chipless patterned conductor of claim 6, wherein the two notches are on opposite sides of the disk.

8. The chipless patterned conductor of claim 1, further comprising:
a ground plane; and
a dielectric layer disposed between the one or more glyphs and the ground plane.

9. The chipless patterned conductor of claim 1, wherein the one or more glyphs comprises a plurality of glyphs.

10. The chipless patterned conductor of claim 9, wherein a first glyph of the plurality of glyphs has one or more of first ring configuration and a first notch configuration and the second glyph of the plurality of glyphs has one or more of a second ring configuration different than the first ring configurations and a second notch configuration different than the first notch configuration.

11. The chipless patterned conductor of claim 1, wherein the at least one notch is disposed in the second ring.

12. A method of forming a chipless patterned conductor, comprising:
forming at least one glyph from a conductive foil, comprising:
forming a disk;
forming a ring structure comprising least one ring surrounding the disk, wherein one or more of a spacing between the disk and the at least one ring and a width of the at least one ring is configured to determine a characteristic resonant frequency of the glyph;
forming at least one notch in at least one of the disk and at least one ring of the ring structure, the at least one notch configured such that the magnitude of resonances in the glyph are dependent on polarization direction; and
transferring the at least one glyph to a substrate having a first side and an opposite second side and a conductive layer disposed on the second side of the substrate, wherein the at least one glyph is transferred to the first side of the substrate.

13. The method of claim 12, further comprising forming the at least one glyph on a substrate and transferring the at least one glyph to an object.

14. The method of claim 12, wherein forming the at least one glyph comprises forming the at least one glyph directly on an object.

15. The method of claim 12, wherein forming the at least one glyph comprises printing the at least one glyph from a conductive material.

16. The method of claim 12, wherein forming the at least one glyph comprises forming the at least one glyph from a conductive foil.

17. The method of claim 12, wherein the substrate has a first side and an opposite second side and the at least one glyph comprises a first glyph and a second glyph, wherein the first glyph is disposed on the first side of the substrate and the second glyph is disposed on the second side of the substrate.

18. The method of claim 17, wherein the substrate comprises a first substrate layer and a second substrate layer and a conductive layer is disposed between the first substrate layer and the second substrate layer.

19. The method of claim 12, further comprising:
depositing a conductive ground plane on the substrate;
depositing a dielectric layer on the conductive ground plane; and
forming the at least one glyph on the dielectric layer.

20. A system for reading a patterned conductor comprising:
a transmitter configured to transmit an electromagnetic radiation signal towards the patterned conductor, the patterned conductor comprising one or more glyphs each glyph comprising:
a disk;
a ring structure comprising at least one ring surrounding the disk, the at least one ring comprising a first ring surrounding the disk and a second ring surrounding the disk, the second ring configured to serve as a counter electrode for the first ring and the disk, wherein one or more of a spacing between the disk and the at least one ring and a width of the at least one ring is configured to determine a characteristic resonant frequency of the glyph; and
at least one notch in at least one of the disk and at least one ring of the ring structure, the at least one notch configured such that the magnitude of resonances in the glyph are dependent on polarization direction, wherein each glyph is configured to backscatter at least a portion of the electromagnetic radiation based on the characteristic resonant frequency and the magnitude of resonances;
a receiver configured to receive a backscattered signal; and
a processor configured to associate the backscattered signal with a digital signature.

* * * * *